Oct. 13, 1970  P. P. STRICH  3,533,837
APPARATUS FOR THE CONTINUOUS EXTRACTION OF WATER
SOLUBLE MATERIALS FROM SOLIDS BY DIFFUSION
Filed Oct. 9, 1967  4 Sheets-Sheet 1
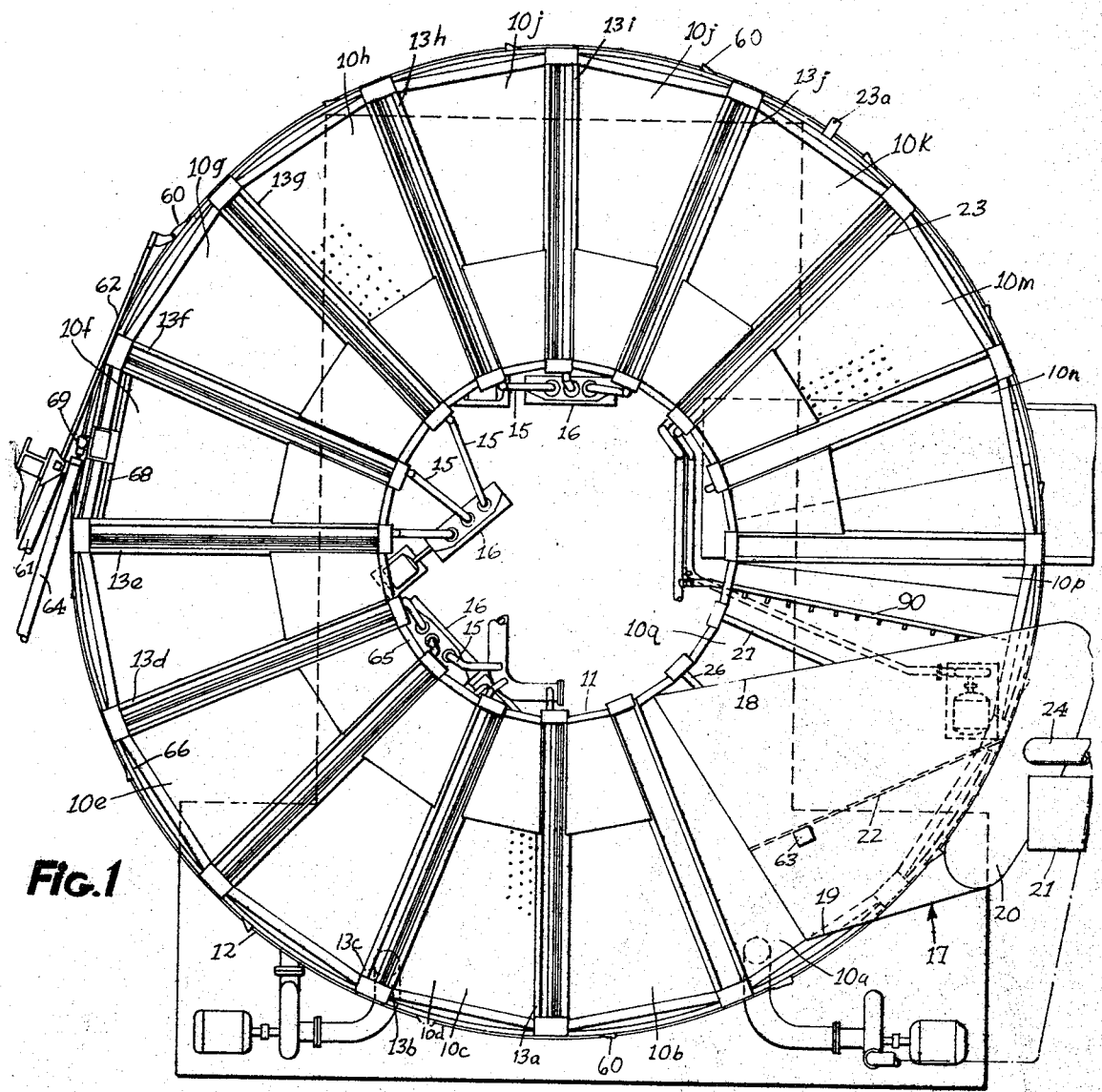
Fig. 1
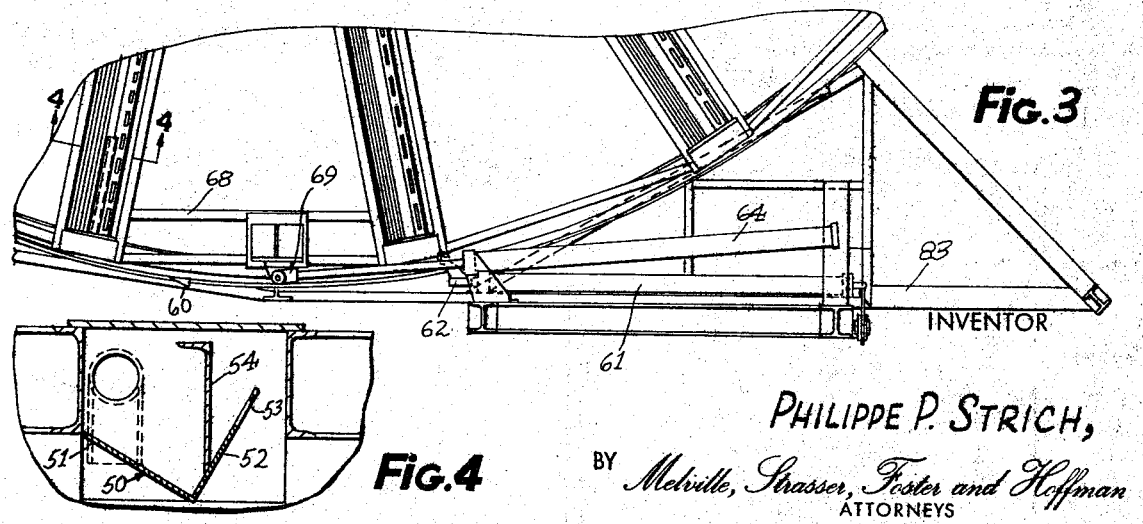
Fig. 3
Fig. 4
INVENTOR
PHILIPPE P. STRICH,
BY Melville, Strasser, Foster and Hoffman
ATTORNEYS Oct. 13, 1970 P. P. STRICH 3,533,837
APPARATUS FOR THE CONTINUOUS EXTRACTION OF WATER
SOLUBLE MATERIALS FROM SOLIDS BY DIFFUSION
Filed Oct. 9, 1967 4 Sheets-Sheet 2

INVENTOR

PHILLIPE P. STRICH,

BY *Melville, Strasser, Foster and Hoffman*
ATTORNEYS

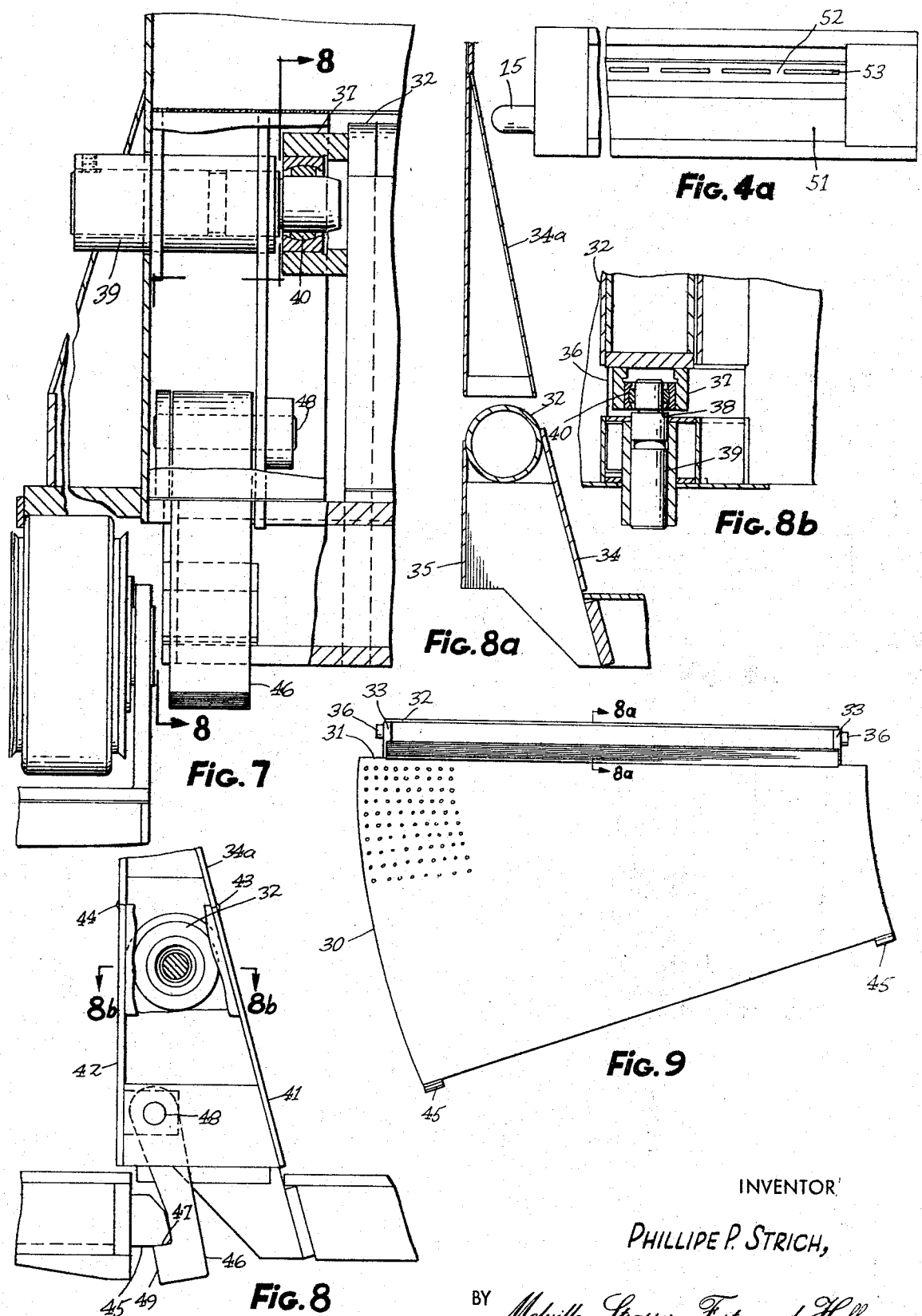

Oct. 13, 1970     P. P. STRICH     3,533,837
APPARATUS FOR THE CONTINUOUS EXTRACTION OF WATER
SOLUBLE MATERIALS FROM SOLIDS BY DIFFUSION
Filed Oct. 9, 1967     4 Sheets-Sheet 4

INVENTOR:
PHILLIPE P. STRICH,

BY *Melville, Strasser, Foster and Hoffman*
ATTORNEYS

United States Patent Office 3,533,837
Patented Oct. 13, 1970

3,533,837
APPARATUS FOR THE CONTINUOUS EXTRACTION OF WATER SOLUBLE MATERIALS FROM SOLIDS BY DIFFUSION
Philippe P. Strich, Ponce, Puerto Rico, assignor to Suchem, Inc., Ponce, Puerto Rico, a corporation of Puerto Rico
Filed Oct. 9, 1967, Ser. No. 673,638
Int. Cl. B01d 11/02; C13d 1/10, 1/12
U.S. Cl. 127—6                           10 Claims

ABSTRACT OF THE DISCLOSURE

System for the continuous extraction of water soluble materials from stacks of solids by diffusion. In this system, measured quantities of solids containing a predetermined amount of water soluble materials are caused to traverse a circular path while being sequentially washed by solutions having decreasing amounts of the soluble materials therein. The system is further characterized by a final step wherein the stacks of solids are substantially reduced in size on the order 50 percent and washed by a solution free of soluble materials.

BACKGROUND OF THE INVENTION

The preferred invention as taught herein relates to an apparatus and method for the extraction of sugar from cane, and operates on the principle of a counter-current washing of the cane, while said cane traverses a circular path. As will be apparent by the description hereinafter, this invention may be termed as a method and means for the continuous percolation of sugar cane, whereby to achieve an increase in recovery of the sugar.

While it should be understood that the principles and structure taught herein may be applied to other materials, the description will be, for conventience, limited to the extraction of sugar from cane.

For the sake of simplicity and understanding, the production of sugar from the cane field to the snow-white product may be divided into three basic operations: primary extraction, initial heating, and refining. The operation to which this invention applies is the first, i.e., primary extraction. A glossary of terms may be helpful at this point for a further and complete understanding of the invention:

Cane—sugar containing stalks or portions thereof.
Bagasse—spent cane, or cane after substantial removal of sugar.
Juice—low concentration sugar in solution.
Syrup—higher concentrations of sugar in solution.

A prior art method for the primary extraction stage of processing included harvesting, shredding, and pressing by means of steel rollers to press out the juice. Through evaporation, the juice was converted to syrup in preparation for the second stage of operation. The sugar remaining in the bagasse was lost as it was common to utilize the spent cane as fuel to generate power for the mill. It should thus be apparent that any proposed increase in yield at this intial stage will result in a correspending increase in the final product. For example, world-wide production is such that a four percent increase in yield, which now covers about fifty million tons annually, would mean an additional two million tons with very little added cost.

It is therefore a primary object of this invention to provide an improved and more efficient apparatus for the extraction of water soluble materials from solids.

A further important object of this invention is the method of counter-current washing of large stacks of solids, such as a compartmented bed of sugar cane stock rotating in a circular path, whereby the quantity and yield from the method approaches a level heretofore unattainable by prior art methods.

Still another object of this invention is the provision of a series of oscillating sprayers arranged in a radial relationship above the rotating solids—a further object being the utilization of a single hydraulic system to control said oscillation and said rotating solids.

A further object of this invention is the provision of a method for reducing the depth of the processed material prior to the final washing thereof.

A further object of this invention is the arrangement and operation of the system whereby complete removal of the washed solids is accomplished and the parts washed prior to re-entry into the system.

Additional advantages and objects will become apparent to those skilled in the art upon reading this description, especially when taken in conjunction with the accompanying drawings. Like reference characters have been used to designate similar and related parts.

BRIEF DESCRIPTION OF DRAWINGS

FIG. 1 is a plan view of a continuous diffusing mechanism constructed in accordance with this invention and capable of carrying out the process as taught herein.

FIG. 3 is a plan view of a portion of the mechanism shown in FIG. 1 illustrating the hydraulic system employed to move same.

FIG. 4 is an enlarged sectional view taken along line 4—4 of FIG. 3.

FIG. 4a is a plan view of a typical sprayer shown in FIG. 4.

FIG. 7 is a side view, with parts in section and parts removed, of the pivoting and latching mechanism used in the several diffusing compartments of this invention.

FIG. 8 is a sectional view taken along the line 8—8 of FIG. 7.

FIG. 8a is a sectional view taken along the line 8a—8a of FIGS. 7 and 9.

FIG. 8b is a partial sectional view taken along the line 8b—8b of FIG. 8.

FIG. 9 is a plan view of a typical compartment gate used in the mechanism illustrated in FIG. 1.

SUMMARY OF THE INVENTION

Figure 2:
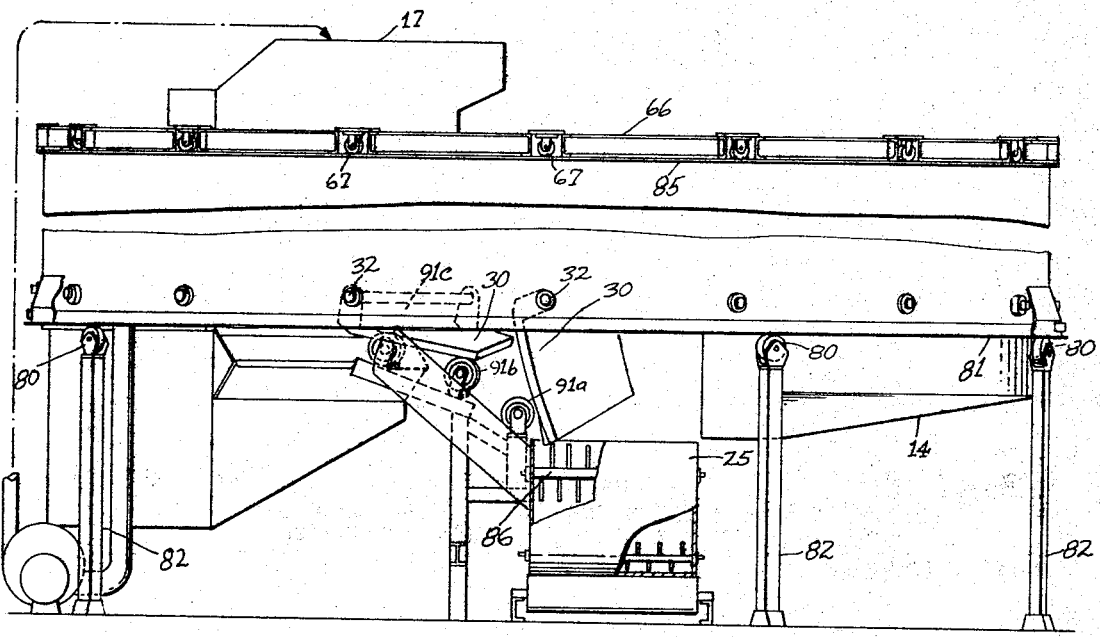
FIG. 2 is a right side elevational view observed from the right side of the mechanism shown in FIG. 1.

Briefly, in the practice of this invention cane shredded into pieces approximately two inches long constitutes the feed employed in the system. It should be understood that by shredding, it is intended to encompass cane that has been prepressed as well as merely shredded. That is, this system may be used to supplement or replace the conventional squeeze roller system.

The feed cane is mixed in a scalding hopper with juice, in the neighborhood of three times its weight. This not only provides the well-known advantages of scalding, it presents a means by which the cane is introduced into the feed hopper, whereupon it enters the diffuser system. The feed hopper is a slowly oscillating unit which may have a channeling system to help insure a more uniform distribution of the feed prior to the diffusion process.

The diffuser portion of the structure is essentially doughnut configured and consists of a series of pie-shaped compartments spaced substantially uniformly throughout. The floor of each compartment is closed during the percolating process by a hinged frame, the frame being covered by a perforated corrugated screen to permit passage of the percolating liquid. Below each compartment is a corresponding tank to receive the liquid dripping from the diffuser. Each tank is connected to a pump which forces the liquid caught by the tank to a sprayer above the diffuser unit and disposed radially with respect to said unit. Thus, there is a sprayer corresponding to each tank; however, a given tank is connected to the adjacent sprayer in a direction counter-current to the movement of the cane. In other words, the movement of the percolating and pumped liquid follows a circular saw-toothed path. The sprayers are arranged to move back and forth over a given compartment containing cane, during periods of non-movement of said compartment, whereby to insure a more uniform percolation. Further, the sprayers are constructed to provide for a more even distribution of the liquid.

One important feature of this invention is the dual cylinder arrangement which provides for the constant oscillating action of the several sprayers, plus the intermittent rotation of the cane compartments. While this arrangement provides for continuous uninterrupted action, it should be understood that manual controls are also contemplated, especially for intermittent checking of the system, and for starting.

It will be recalled that the compartment floors are hinged, a latch being used to hold said floor in place. As the rotating cane in the diffuser approaches one complete revolution, said latch is rendered inoperative and the load of bagasse is deposited into a discharge hopper, said hopper having a cross-sectional area approximately double that of the compartments. With the stack of bagasse substantially reduced in size by evenly distributing same within the hopper, a final wash with fresh water occurs. By this system, a thorough washing of all the spent cane is accomplished without limiting the capacity of the diffuser.

At the bottom of the hopper there is located a flight conveyor belt. This belt carries the exhausted cane away from the diffuser and into a dewatering mill. The liquid removed in this final operation is returned to the system through a clarifier into the sprayer over the compartment preceding the compartment receiving the percolated water from the hopper. Following discharge, a cleaning station is provided to thoroughly clean each compartment to remove any bagasse particle and thus prevent the formation of any contaminant. While the system is characterized by continuous production, it has the unique advantage of being cleaned without interruption to the production. Subsequent the cleaning, and through further rotation of the several compartments, the floor frame is tilted back into a latched position for the reception of a new supply of cane.

By the foregoing brief description, and assuming a clockwise cane movement, it should be apparent that as the cane traverses an angle of about 260°–320° it is being washed by juice of decreasing concentration. That is, a metered quantity of fresh water is introduced into the system at the hopper just subsequent discharge of the bagasse. This action starts the liquid on its countercurrent, saw-toothed path. As this reverse flow continues, the liquid increases in concentration of sugar. Before concluding its flow, the juice is recirculated in one of the last compartments and heated. While the bulk of the juice is ready for subsequent processing and refining, a portion is used as the vehicle for introducing new cane into the system.

DETAILED DESCRIPTION OF THE INVENTION

Referring now in greater detail to the drawings shown in FIGS. 1 and 2, it will be observed that the mechanism of this invention comprises a plurality of pie-shaped compartments 10a–10q arranged in a circle, said arrangement being defined by concentric annular portions 11 and 12. By means to be described hereinafter, it will be seen that said compartments 10 are supported on a frame and movable thereon intermittently in a single circular direction, i.e., clockwise.

Above the compartments 10 there are provided a plurality of radially disposed sprayers 13a–13m arranged in a plane and adapted to reciprocate within said plane a distance equal to the annular extent of a typical compartment 10. Each of said sprayers 13 is connected to a tank or receptacle 14 (see FIG. 2) below the compartments 10 by means of a flexible conduit 15 and pump 16.

The feed to the mechanism is accomplished by the placement of a hopper 17 which deposits the solids, such as shredded cane, into the compartment 10 momentarily situated below the opening of said hopper 17. Said hopper comprises a chute defined by sidewalls 18 and 19 and is fixed to said sprayers 13 to reciprocate therewith, so as to insure an even distribution of the cane within the receiving compartment 10. The hopper 17 is further characterized by an extended entry opening 20 whereby cane may be received from a fixed conveyor 21 which, under continuous operation, is depositing cane through said opening 20. As an optional feature, a channel separator 22 may be situated within said hopper 17 to facilitate the distribution of the cane.

Solvent, initially in the form of fresh water, is admitted into the system at compartment 10m through a sprayer 23. Sweet water extracted from a final pressing operation is combined with the percolated fresh water and started on the diffusion operation by means of inlet 23a. The fresh water and sweet water thus begin their counter-current successive passage through the compartmented beds of cane and become more enriched with sugar until it is collected in the final tank near the cane entry into the mechanism. The juice at this point is recirculated into the preceding bed of cane before it is finally processed as follows. The sugar enriched solvent or juice from the final tank is then removed and heated to a temperature of approximately 170° F. A portion of the heated juice is then returned to the system by means of inlet 24 disposed near the conveyor 21 and adjacent opening 20. This latter operation helps to cause the fresh cane to distribute and settle after being deposited through hopper 17. The remaining portion of the heated juice is transported to the factory for refining into the crystalline product.

The spent cane or begasse is discharged from the compartment 10 after passing the fresh water wash and deposited into an elongated hopper 25 whose cross section approximately doubles that of a typical compartment 10. It will be seen from the description to follow why such capacity is essential to the economic operation of this system. Here, the reduced bed of bagasse is washed with fresh water, which, along with the water subsequently pressed therefrom by means of rollers, is returned to the system as sweet water in the manner indicated above.

Turning now to further details of the mechanism of this invention, it will be recalled that each compartment 10 is essentially pie-shaped. The compartment is defined by four vertical walls, the two larger radial walls 26 and 27 being common to two adjacent compartments and radially disposed with respect to the circular mechanism. The other two walls may be defined as the annular walls. In FIG. 9, it will be seen that the load bearing portion or bottom 30 of the compartment is a perforated plate or corrugated screen which permits the percolating fluid to pass therethrough. To facilitate the removal of the bagasse after it has been thoroughly washed, the bottom 30 is hinged at one side thereby permitting the bagasse to drop into the hopper 25.

FIGS. 7, 8, 8a, 8b and 9 illustrate in detail the construction of the hinging and locking mechanism of a typical compartment. The perforated bottom 30 is secured along one side 31 to a parallel pivot arm 32, which for convenience may be steel tubing, by means of several spaced apart brackets 33 welded thereto. Running the length of said arm, which it will be observed is less than side 31, are two sealing plates 34 and 35, thereby making the arm 32 integral with the bottom 30. A further observation is that plate 34 is substantially planar with wall portion 34a. This helps to eliminate potentially static areas during the movement of the juices and the cane. The ends 36 of arm 32 are characterized by a reduced portion 37 having a recess 38 for receiving a pivot shaft 39. The pivot shaft 39 is provided with a ball joint 40, at one end thereof, which is received in said recess 38. The opposite end of pivot shaft 39 is fixed with respect to the vertical annular walls of the compartment. Thus, by this arrangement of parts, the bottom 30 is caused to freely pivot about shaft 39.

These latter pivoting joints are shown in an end view in FIG. 8. Here, extensions 41 and 42 to the vertical walls are provided as a means to protect said joints. The extensions 41 and 42 may be fixed such as by welding at 43 and 44. Within the end enclosures formed by said extensions are the locking mechanism for the bottom 30. While it should be understood that mechanical or electrical systems may be employed to operate the bottom gate, an effective gravity motivated system has been found effective. The bottom 30 is provided with a pair of projections 45 which are adapted to seat within the latch 46 at the elbow 47. The latch 46 pivots freely about the pin 48. The center of gravity of said latch is such that under an unloaded condition it will lie in a position capable of engagement with the projection 45. It will be observed from the description to follow that the latch is disengaged by providing a strategically located abutment which contacts a forward face 49 of the latch 46. This causes the latch to pivot thereby releasing the bottom 30.

As indicated above, the juice from each tank located below each compartment is pumped to the adjacent sprayer 13, taken in a direction counter-current to the movement of said compartment. While there is no limitation on the number of pumps which can be employed, a single pump of suitable capacity can accommodate several tanks. In any case, the juice is pumped to the proper sprayer 13 which functions more in the nature of an overflowing trough. The sprayer employed herein is shown in greater detail in FIGS. 4 and 4a. The juices are pumped through conduit 15 onto the V-shaped trough 50. One side 51 is fixed to the side of the sprayer, while the other side 52 is free. To control the flow of juice from the trough 50, longitudinal openings 53 of varying sizes are provided in side 52. By this method, a greater proportion of the liquid is distributed to the outer portion of the compartment. To help maintain a more uniformly divided flow from the trough, a barrier 54 is spaced a distance above the side 52.

Figure 5:
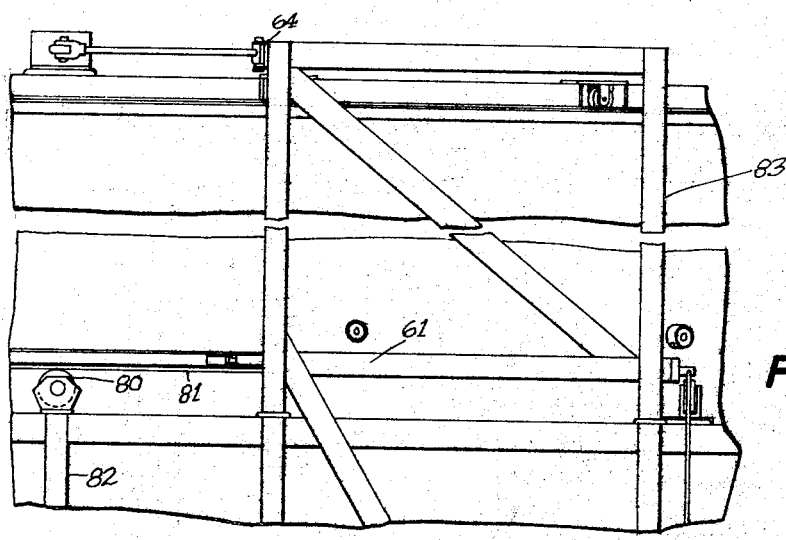
FIG. 5 is an enlarged left side elevational view, with parts removed, of the mechanism shown in FIG. 1.
Figure 6:
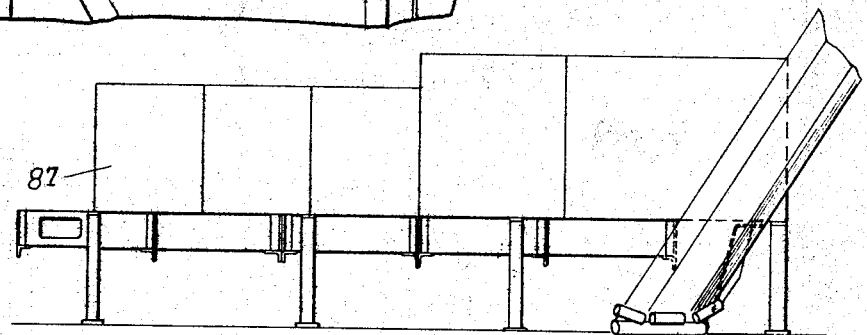
FIG. 6 is a side elevational view of a hopper and conveyor system employed with the mechanism shown in FIG. 1.
Figure 13:
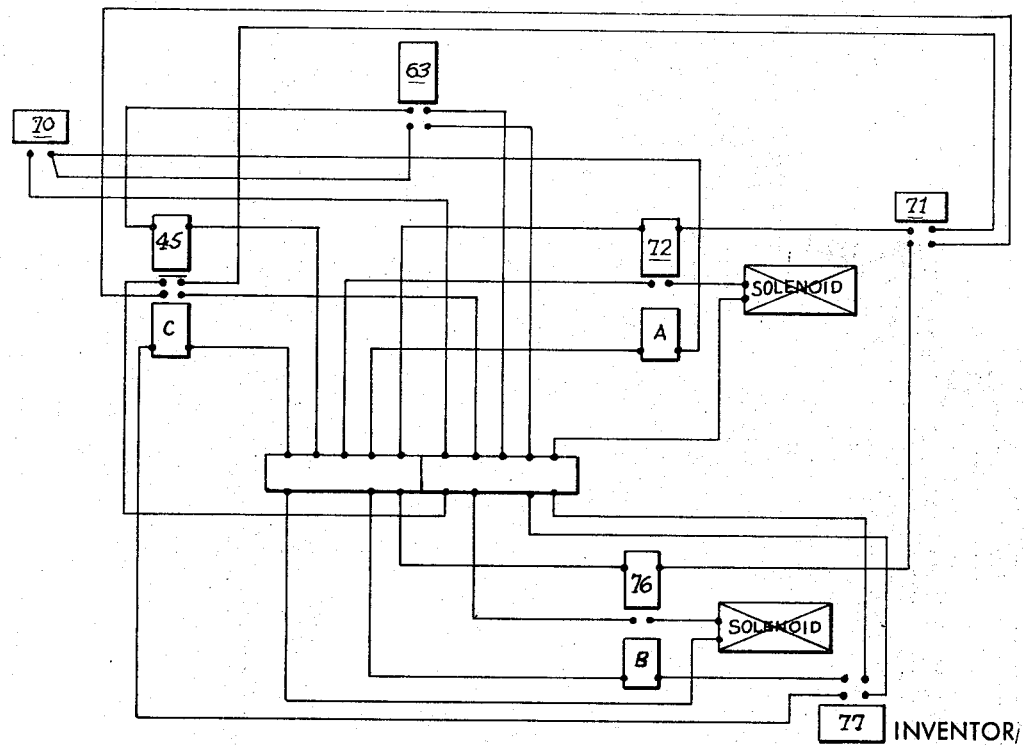
FIG. 13 is a schematic electrical wiring diagram used to move the mechanism shown in FIG. 1.

The movement of the compartments and sprayers are accomplished by means of a dual hydraulic cylinder system. The mechanics of the system are shown in FIGS. 1, 3 and 5, while the electrical circuitry for same is shown schematically in FIG. 13. Outside the partition of each radial compartment wall there is provided an abutment 60. In the same horizontal plane as said abutment 60, and secured to the support structure for the mechanism, there is mounted a hydraulic cylinder 61 whose piston 62 pushes against the adjacent abutment 60 causing it to move a distance substantially equal to the stroke of said piston. With the piston returned to its retracted position, a new abutment is engaged. It should be apparent that by this operation, the intermittent movement of the diffuser compartment is realized. The action may be triggered in a number of ways. For example, a level control may be provided to sense the filling of the compartment below the hopper 17. Alternatively, a triggering switch 63 may be positioned in said hopper to measure the flow of cane therethrough. In any event, the intermittent movement occurs with each filling of a compartment. With a typical compartment having a capacity of 1525 cubic feet, and filling same with cane at the rate of 6000 lbs. per minute to produce a bed height of 10 feet, activation of the cylinder 61 will take place about every 3 minutes.

The reciprocation or oscillation of the sprayers 13 is accomplished by a second hydraulic cylinder 64 secured to the sprayers. To facilitate this latter operation, the ends of sprayers 13 are fixed to concentric annular rings 65 and 66. Mounted on said rings are a plurality of rollers 67 (FIGS. 2 and 5) which ride on the concentric annular walls of the several compartments.

While there is no limitation as to the location of the respective cylinders 61 and 64, it was found convenient to place them at a point about the circumference of the mechanism away from the cane charge and discharge areas. Returning now to the illustration in FIG. 3, two adjacent sprayers, such as 13e and 13f, are provided with an added brace 68 therebetween. To this brace, the head of piston 69 of cylinder 64 is pivotally secured. The connection should not be fixed due to the slightly different paths of travel of the sprayer and piston. It should therefore be obvious that with each stroke of piston 69, the sprayers 13 are caused to oscillate above the several compartments.

It will be remembered from the above that the function of the sprayers 13 is to uniformly distribute the juice from a preceding in-line tank to a compartmented bed of cane. Hence, during the filling of one compartment 10 from the hopper 17, the hydraulic cylinder 64 connected to the sprayers 13 is moving back and forth. The limit switches 70 and 71, shown schematically in the circuit diagram of FIG. 13, with normally open contacts, act on the latching relays 72 to energize or de-energize the solenoid 74 controlling cylinder 64.

Regardless of the relative position of the sprayers with respect to the compartments, as soon as the receiving compartment is filled the triggering or limit switch 63 interrupts the action of the cylinder 64. The limit switch 63 has two normally open contacts, one contact which energizes the coil of the latching relay 75 and opens a normally closed contact of said relay 75. This action opens the circuit through the latching relay 72 and limit switch 71 so as to prevent the cylinder 64 from extending the piston 69. The second normally open contact of limit switch 63 is in parallel with a normally open contact of limit switch 70. When closed, this will retract the cylinder 64 in the same manner as the limit switch 70 nn the normal course of the operation. In other words, it will not be necessary for the piston 69 to go its full course. Thus, with the filling of each new compartment, the sprayers 13 will be retracted to their most counter-clockwise position. Simultaneously with the foregoing, limit switch 63 which controls the level of the charged cane, energizes a second coil of the latching relaly 75 which, when a second normally open contact limit switch 71 is closed, there if found a closed circuit through the normally open contact of limit switch 75. This energizes the latching relay 76 which in turn activates the cylinder 61 acting on the diffuser compartments and causing said compartments to move an increment of one compartment distance. With the cylinder 61 in an extended condition, a limit switch 77 is actuated and the two normally open contacts are now closed and act on the second coil of the latching relay 76 and 75. With this action, the cylinder 61 returns to a retractable position where it is now ready to repeat the foregoing cycle.

It should be apparent from the foregoing that with the action described above, means must be provided to facilitate same. The latter is accomplished through a plurality of rollers 80 upon which a continuous annular ring 81 rides. Ring 81 is secured to or may be part of the compartment 10. While there is no fixed number of rollers required, a typical structure to which this invention relates will use 9, that is, six on the outside and three inside. All of the rollers 80 are mounted in a stationary pivot on a supporting column 82. While it is not illustrated, the inner annular ring which is secured to the compartments is fixed about the center by four horizontal guiding rollers. No restriction is provided on the ring 81 so as to allow for heat expansion. The support columns 82 may also be use to support the series of tanks into which the juice is received. Additional structure 83 may be provided for mounting cylinders 61 and 64.

The oscillating action of the sprayers 13 is accomplished by rollers 67 riding on the outer flanged edge 85 of the compartments 10.

Viewing the mechanism illustrated in FIG. 1, the discharge from the compartments 10 will occur at the right. FIG. 2 shows the elongated hopper 25 which receives the spent cane. As noted above, the bagasse is removed from the compartments 10 as the bottom opens. Hopper 25, which has a cross section twice as large as a typical compartment, receives the bagasse. To assist in the uniform distribution of the bagasse, a spreader 86 is disposed therein. As a result of this action, a bed of spent cane approximately one-half the depth of the compartmented beds is formed. At this time, a final wash with pure water is made of the reduced bed of cane. It is essential that fresh water contact the entire depth of the bed. This becomes impossible when the depth exceeds 5 feet. However, to restrict the entire operation to only a bed of 5 feet maximum would unduly restrict the capacity of the operation. With the present system, such a limitation is absent.

After the final fresh water wash in hopper 25, the bagasse is conveyed by means of conveyor 87 to a press (not shown) where the remaining juice is withdrawn and sent to a press water clarifier 88.

To provide for a fresh batch of cane in this continuous operation, and to insure the complete removal of all bagasse particles which may cause contamination later, the emptied compartment 10, especially the bottom 30, must be washed and locked to receive the fresh batch. During the interval between the removal of spent cane and the filling with fresh cane, the emptied compartment 10 is washed by means of sprayer 90 situated in a position preceding the hopper 17. The latter wash water, with the bagasse particles removed, is pumped to the compartment which is adjacent and preceding the discharge station. It should be apparent from the preceding that all of the water which enters the system is carefully metered so as not to unduly dilute the resulting juice. The water for sprayer 90 is taken from the main water line for the system after measurement has been made. And, such spray water may be controlled by means of a solenoid with a timer.

With the compartment carefully washed, the bottom 30 is tilted back into a locked or engaged position with latch 46. This is accomplished by positioning a series of rollers 91a–91c which sequentially engage and urge the bottom into the locked position (see FIG. 2). By the foregoing step, it will be seen that the cleaned compartment is ready to receive a fresh batch of cane and repeat the operation outlined above.

Figure 10:
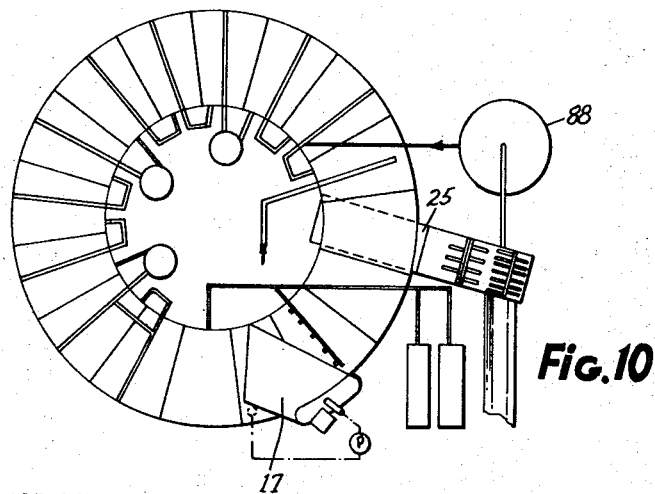
FIG. 10 is a schematic diagram illustrating the major components of the invention as taught herein.
Figures 11, 12:
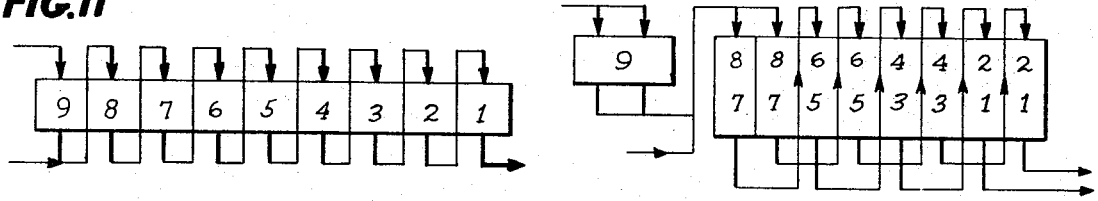
FIG. 11 is a flow chart of a typical prior art method whereby the juice circulation is counter-current to the flow of solids.
FIG. 12 is a flow chart of the process taught herein whereby a greater capacity is realized.

Turning now to the operation of the system as shown schematically in FIGS. 10 and 12, and the advantages to be realized over the prior art of FIG. 11, it will be noted that the process of this invention operates on the principle of a counter-current washing of the cane. The use of the compartmented diffuser offers the possibility of increasing the layer of the cane bed, and consequently the capacity of a given diameter diffuser. That is, while the prior art is limited to a bed depth of approximately 5 feet, the present invention can accommodate a depth of 10 feet. There are several reasons for this, namely:

(1) The final wash should be done on a bed of cane having a maximum depth of 5 feet. This is necessary so that fresh water, not containing any sugar, be in contact with the bottom part of the layer.

(2) Where fresh or recovery water is introduced into the system, it is necessary to size the compartment area in order for the flow of water to pass through the cane layer.

(3) Where the bed of cane exceeds one foot, the filtration rate is not appreciably affected by increasing thicknesses of the bed.

(4) The partitions between each compartment eliminate the risk of juice intermixing. This intermixing will occur as a result of a normal flow of the fluid which follows a conical pattern. That is, the partitions help to channel the flow of fluid through the bed.

(5) The time of contact between the cane and the juice at each diffusion stage should be substantially identical throughout the total cycle.

This latter principle may be dramatically illustrated by the comparison between FIGS. 11 and 12. In the latter figures, the cane moves from right to left, while the fresh water starts at the left. This is believed to clearly demonstrate the advantages of the present invention over the system taught by the prior art.

An exemplary embodiment may best be described by viewing the schematic diagram of FIG. 10.

EXAMPLE

While the dimensions of the mechanism shown schematically in FIG. 10 may vary to a large extent, the following are representative of a typical operative structure capable of employing the principles as taught herein:

Compartment data:
 (a) Total number of compartments—16.
 (b) Annular end walls—approximately 4 feet and 9 feet.
 (c) Radial walls—approximately 12 feet.
 (d) For 10 foot cane bed depth—capacity is approximately 1525 cubic feet.

With the physical structure described above, shredded cane is fed through hopper 17 at the rate of about 150 tons per hour in pieces approximately 2 inches in length. To facilitate the feed, juice on the order of about 3 times the weight of the cane is added to the first compartment along with said cane. Concurrently with the feeding of a given compartment, the sprayers located above the other compartments are oscillating in a radial path equal to the annular dimension of the compartments. A complete cycle for each sprayer is about one minute, or 30 seconds in a single direction.

With the first compartment filled to a depth of about 10 feet, the filling being accomplished in 3–4 minutes, the compartment is moved one compartment increment and an emptied compartment is brought into position below the feed hopper 17 to be filled. The movement of the compartments takes about 30 seconds. With each such movement, a compartment containing spent cane is being emptied, and another being washed. The fresh water being used for the final wash in the receiving hopper 25 is approximately 20–30% by weight of the cane therein.

Since the total quantity of water added to the system must be carefully controlled to avoid dilution, it is necessary to know the quantities from the several sources. In a typical operation, the total weight of juice recovered is equal to the weight of the cane entering the system. Thus, while the press water recovered from the discharged bagasse represents about 60–65% of the entering cane by weight, fresh water on the order of about 35–40% by weight of cane will be used to bring the weight of the liquid up to that of the cane. From this fresh water, approximately 1% will be used to wash the screen of the emptied compartment. This amount will be taken intermittently from the fresh water line, recovered, and returned to the system.

By following the foregoing procedure, with variations in feed rates of about 60–300 tons per hour, it is possible to extract 97% of the sugar entering the system, as a result of the counter-current compartmented washing of the cane.

It should be apparent from the preceding description and exemplary embodiment that certain modifications may be made in the system without departing from the spirit and scope of the invention. Accordingly, no limitation is intended to be imposed herein except as set forth in the appended claims.

The embodiments of the invention in which an exclusive property or privilege is claimed is defined as follows:

1. Apparatus for the continuous extraction of water soluble materials from solids by diffusion, comprising:
   (a) a frame,
   (b) an annular compartmented chamber for receiving said solids and supported for rotational movement on said frame,
   (c) each compartmented segment of said chamber having a uniform cross section from top to bottom and provided with a floor capable of passing said water soluble materials and temporarily restraining said solids,
   (d) a plurality of tanks underlying each said compartmented segment, one tank corresponding to each of said segments,
   (e) a plurality of sprayers for distributing a solvent containing said water soluble materials and arranged radially above said segments for oscillating movement over a fixed angular distance,
   (f) means connecting said tanks with said sprayers,
   (g) a fixed chamber having a cross section which exceeds said segments for receiving the solids therefrom,
   (h) means for introducing a quantity of solvent into said fixed chamber,
   (i) means transmitting said solvent to a sprayer at a first location,
   (j) means for admitting a quantity of solids into one compartmented segment at a second location, and
   (k) means for rotating said compartmented segments from said second location to said first location, said last named means comprising a dual hydraulic system for oscillating said sprayers.

2. Apparatus according to claim 1 wherein the movement of said compartmented chamber is in a single direction and accomplished at regular intervals.

3. Apparatus according to claim 1 wherein said sprayers comprise a trough, one side of which is provided with a plurality of openings adapted to allow the flow of solvent therefrom, whereby said openings are characterized by a regularly increasing lateral dimension from the innermost opening to the outermost opening.

4. Apparatus according to claim 1 including means for recirculating a portion of said solvent received in the tank adjacent said second location.

5. Apparatus according to claim 1 wherein said dual hydraulic system includes means associated therewith for admitting the solids into the system, whereby to activate said dual hydraulic system after a predetermined quantity of solids has been admitted.

6. Apparatus according to claim 1 including triggering means, the activation of which interrupts the oscillating movement of said sprayers causing them to return to one extreme of their angular movement.

7. Apparatus according to claim 1 wherein the oscillations of said sprayers are continuous during periods of admitting solids at said second location.

8. Apparatus according to claim 7 wherein the means for admitting a quantity of solids into the compartmented segments is connected to said sprayers and oscillates therewith.

9. Apparatus according to claim 1 wherein means are provided to render each said floor operative to restrain said solids, and including means to render said floor inoperative so as to permit the transfer of solids from said compartmented segment to said fixed chamber.

10. Apparatus according to claim 9 including means for cleaning said compartmented segment and floor during the period when said floor is inoperative.

References Cited

UNITED STATES PATENTS

| | | | |
|---|---|---|---|
| 1,150,263 | 8/1915 | Godbe | 23—269 |
| 2,840,459 | 6/1958 | Karnofski | 23—269 X |
| 3,021,201 | 2/1962 | Upton | 23—272.5 |
| 3,113,954 | 12/1963 | Upton | 23—269 X |
| 3,131,202 | 4/1964 | Depmer | 23—269 X |
| 3,248,263 | 4/1966 | Silver et al. | 127—4 X |

MORRIS O. WOLK, Primary Examiner

D. G. CONLIN, Assistant Examiner

U.S. Cl. X.R.

23—269; 127—5, 43